United States Patent
Jang

Patent Number: 6,084,840
Date of Patent: Jul. 4, 2000

[54] OPTICAL PICKUP FOR USE WITH A RECORDING MEDIUM

[75] Inventor: Hag-hyeon Jang, Suwon, Rep. of Korea

[73] Assignee: Samsung Electronics Co., Ltd., Rep. of Korea

[21] Appl. No.: 09/007,209

[22] Filed: Jan. 14, 1998

[30] Foreign Application Priority Data

Jan. 17, 1997 [KR] Rep. of Korea .......................... 97-1305

[51] Int. Cl.$^7$ ..................................................... G11B 7/00
[52] U.S. Cl. ......................................... 369/112; 369/44.14
[58] Field of Search ................................ 369/44.26, 109, 369/103, 112, 44.14, 44.37, 44.41, 110, 120

[56] References Cited

U.S. PATENT DOCUMENTS 5,579,298 11/1996 Opheij et al. ......................... 369/109 X

*Primary Examiner*—Paul W. Huber
*Attorney, Agent, or Firm*—Dilworth & Barrese

[57] ABSTRACT

An optical pickup is provided which includes a light source and an objective lens for converging incident light from the light source onto a recording medium. The objective lens is arranged to be movable in radial and vertical directions of the recording medium. A holographic optical element (HOE) for changing a traveling path of the incident light is positioned along an optical path between the light source and the recording medium, and has first and second diffraction plates which are divided along a first boundary line and have different diffraction patterns. A photodetector has first and second divided plates which are divided along a second boundary line which is perpendicular to the radial and vertical directions of the recording medium. The first and second divided plates receive light passed through the first and second diffraction plates after being reflected from the recording medium. The first boundary line of the HOE is arranged at a predetermined angle with respect to the radial direction of the recording medium, such that the amount of light received by the first and second divided plates is equal to each other when the center of the objective lens is properly located on the optical path, and amount of light received by the first and second divided plates is different from each other when the center of the objective lens is deviated from the optical path.

9 Claims, 6 Drawing Sheets

OPTICAL PICKUP FOR USE WITH A RECORDING MEDIUM

BACKGROUND OF THE INVENTION

1. Field of the Invention

The present invention relates to an optical pickup, and more particularly, to an optical pickup capable of detecting deviation of an objective lens from an optical path.

2. Description of the Related Art

Generally, an optical pickup irradiates light emitted from a light source to a recording surface of an optical disk to record/reproduce information on/from the disk in a non-contact manner.

Referring to FIG. 1, an optical pickup include a light source 10, a holographic optical element (HOE) 20, an objective lens 30 and a photodetector 40. The optical source 10 is a semiconductor laser emitting a laser beam of a predetermined wavelength. The HOE 20 is located on an optical path between the light source 10 and the objective lens 30 to pass light incident from the optical source 10 toward a recording medium 1, and to diffractively transmit light reflected from the recording medium 1 toward the photodetector 40. The objective lens 30 converges light incident from the light source 10 on the recording surface of the recording medium 1. The objective lens 30 is driven in a radial direction (X-axis direction) and a focus direction (Z-axis direction) of the recording medium 1 by an actuator (not shown) according to an error signal detected by the photodetector 40, such that a light spot is precisely formed on the recording medium 1.

The photodetector 40 receives light passed through the objective lens 30 and the HOE 20 after being reflected from the recording medium 1, to detect a radio frequency (RF) signal, a tracking error signal (TES) and a focus error signal (FES). The tracking error signal is detected by a 3-beam method in general. To end this, a grating 15 may be further provided on the optical path between the light source 10 and the HOE 20. Also, the photodetector 40 may be divided into three plates A, B and C which perform photoelectric conversion independently. The FES is detected by a differential phase tracking method. For this, the HOE 30 includes two diffractive plates 22 and 23 each having different diffraction directions. A boundary line 21 between two diffractive plates 22 and 23 is formed in the driving direction of the objective lens 30 to correct the tracking error.

As shown in FIGS. 2A through 2C and 3A through 3C, the FES can be detected according to the change in shape of beams formed on respective divided plates A, B and C. Here, FIGS. 2A, 2B and 2C show the optical path between the HOE 20 and the photodetector 40, respectively, when the objective lens 30 is near the recording medium 1, at an appropriate distance from the recording medium 1, and far from the recording medium 1. Also, FIGS. 3A, 3B and 3C show the shape of a beam formed on the photodetector for the respective cases of FIGS. 2A, 2B and 2C. That is, the values of electrical signals converted from the beams received by the divided plates A and B of the photodetector 40 are differentially amplified by a differential amplifier 45, and the FES can be detected from the result thereof. The detected electrical signals are fed back to the actuator such that the objective lens 30 is driven to compensate for the focus error.

The conventional optical pickup as described above does not have an optical structure for compensating for the error signal which occurs due to the deviation of the light emitted from the light source from the center line of the optical path. Particularly, in a high speed compact disk (CD) for a high speed search or a digital versatile disk (DVD), when a carriage (not shown) on which an optical pickup is mounted moves in the radial (X-axis) direction of the recording medium 1 to recognize the intended track, and then stops its movement, the inertia of the carriage is transferred to the optical pickup. Here, the objective lens 30 elastically moves together with the actuator. Thus, it takes much longer for the objective lens 30 to return to its initial position.

SUMMARY OF THE INVENTION

To solve the above problems, it is an object of the present invention to provide an optical pickup in which the degree of deviation of an objective lens from an optical path is detected, and the detected result is fed back, so that time required for adjusting the center of the objective lens to the optical path can be sharply reduced.

To achieve the object of the present invention, there is provided an optical pickup including a light source and an objective lens for converging incident light from the light source onto a recording medium. The objective lens is arranged to be movable in radial and vertical directions in relation to the recording medium. A holographic optical element (HOE) for changing a traveling path of the incident light is arranged on an optical path between the light source and the recording medium, and has first and second diffraction plates which are divided along a first boundary line and have different diffraction patterns. The optical pickup also includes a photodetector having first and second divided plates which are divided along a second boundary line which is perpendicular to the radial and vertical directions of the recording medium. The first and second divided plates receive light passed through the first and second diffraction plates after being reflected from the recording medium. The first boundary line of the HOE is arranged at a predetermined angle with respect to the radial direction of the recording medium, such that the amount of light received by the first and second divided plates is equal to each other when the center of the objective lens is properly located on the optical path, and the amount of light received by the first and second divided plates is different from each other when the center of the objective lens is deviated from the optical path.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 4:
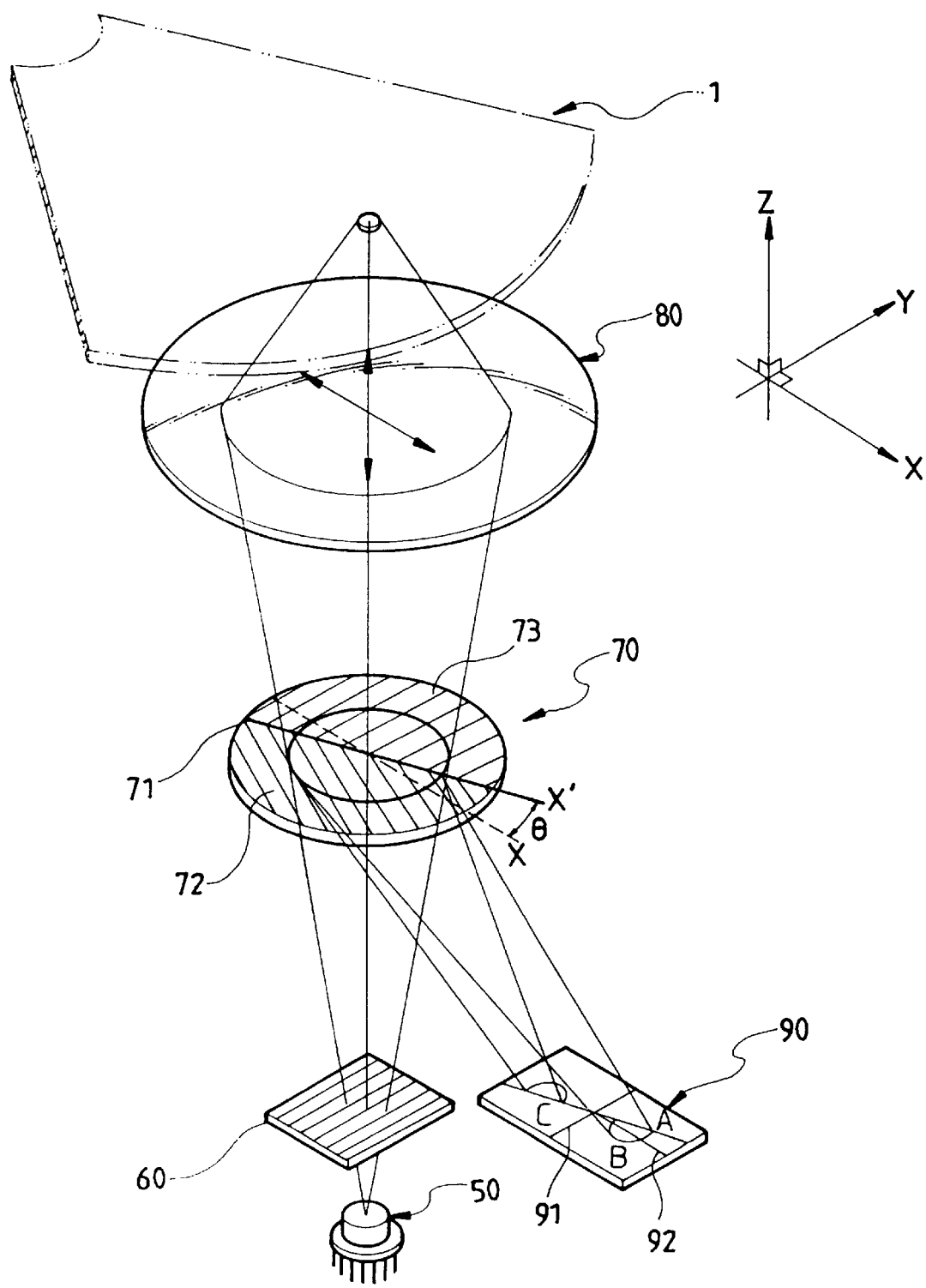
FIG. 4 is a perspective view showing an optical pickup according to a preferred embodiment of the present invention.

Referring to FIG. 4, an optical pickup according to a preferred embodiment of the present invention includes a light source 50, a holographic optical element (HOE) 70, an objective lens 80 and a photodetector 90.

The light source 50 is a semiconductor laser which coincides with the standard of a recording medium, and emits a laser beam of a 635 nm, 650 nm or 780 nm wavelength.

The HOE 70 is arranged on an optical path between the light source 50 and the recording medium 1, to change a traveling path of an incident light. That is, the HOE 70 linearly transmits the light incident from the light source 50 toward the recording medium 1, and diffractively transmits the light reflected from the recording medium 1 toward the photodetector 90. To end this, the HOE 70 has a predetermined diffraction pattern such that the shape of the beam formed on the photodetector 90 changes as the distance between the objective lens 80 and the recording medium 1 changes. That is, the HOE 70 is divided into two parts along a boundary line 71, to form a first diffraction plate 72 and a second diffraction plate 73, each having different diffraction patterns.

The objective lens 80 is arranged on the optical path between the HOE 70 and the recording medium 1, and mounted on an actuator (not shown) which can be driven to correct a tracking error and a focus error. The objective lens 80 moves in the radial (X-axis) direction of the recording medium 1 and in the focal (Z-axis) direction of the recording medium in response to feedback of error signals detected by the photodetector 90, such that a light spot is formed precisely on the intended track of the recording medium 1.

As shown in FIG. 4, the optical pickup of the present invention is characterized as having a HOE 70 with a boundary line (X'-axis) which is arranged at an angle θ with respect to the radial (X-axis) direction of the recording medium 1. This is for detecting a center error signal (CES) representing the degree of deviation of the objective lens 80 from the optical path by the photodetector 90, which will be described later.

The photodetector 90 includes a first divided plate A and B, and a second divided plate C which are divided based on a Y-axis boundary line 91. Here, the Y-axis boundary line 91 is parallel to the Y-axis, that is, perpendicular to the radial direction (X-axis) of the recording medium 1 and the focus direction (Z-axis) of the recording medium. The first divided plate A and B preferably includes two divided plates A and B which are divided along an X-axis boundary line 92 which is perpendicular to the Y-axis boundary line 91, to detect the FES of the objective lens 80 by a differential phase tracking method. The first divided plates A and B, and the second divided plate C receive lights reflected from the recording medium 1 and diffractively passed through the first and second diffraction plates 72 and 73. Here, the detection of the FES is the same as that described with reference to FIGS. 2A through 2C and 3A through 3C. Thus, a detailed description thereon will be omitted.

Also, the optical pickup of the present invention may further include a grating 60 on the optical path between the light source 50 and the HOE 70 that detects the TES of the objective lens 80.

Figure 5A:
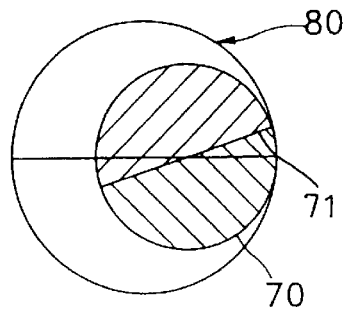
FIGS. 5A, 5B and 5C show the positions of an objective lens and a holographic optical element (HOE) in the optical pickup of FIG. 4, respectively, when the objective lens is deviated from an optical path in the (−)X-axis direction, is on the optical path, and is deviated in the (+)X-axis direction.
Figure 6A:
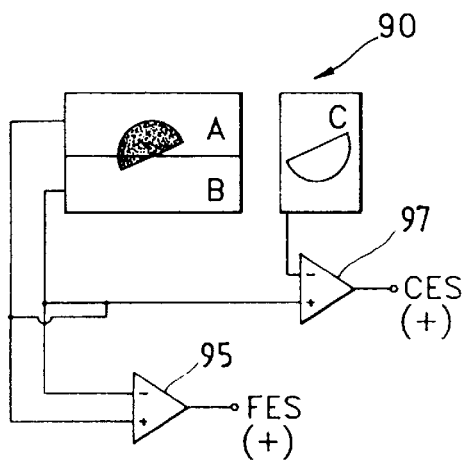
FIGS. 6A, 6B and 6C are schematic diagrams showing distribution of light intensity on the photodetector in the cases of FIGS. 5A, 5B and 5C, respectively.

FIG. 5A is a diagram showing the positions of the objective lens 80 and the HOE 70 when the objective lens 80 is deviated from the optical path in the (−)X-axis direction. In this case, as shown in FIG. 6A, the amount of light received by the first and second divided plates A and B is more than that received by the second divide plate C. Thus, when the signals photoelectrically converted by the first and second divided plates A and B, and the second divided plate C are differentially amplified by a second differential amplifier 97, a positive (+) CES is detected.

Figure 1:
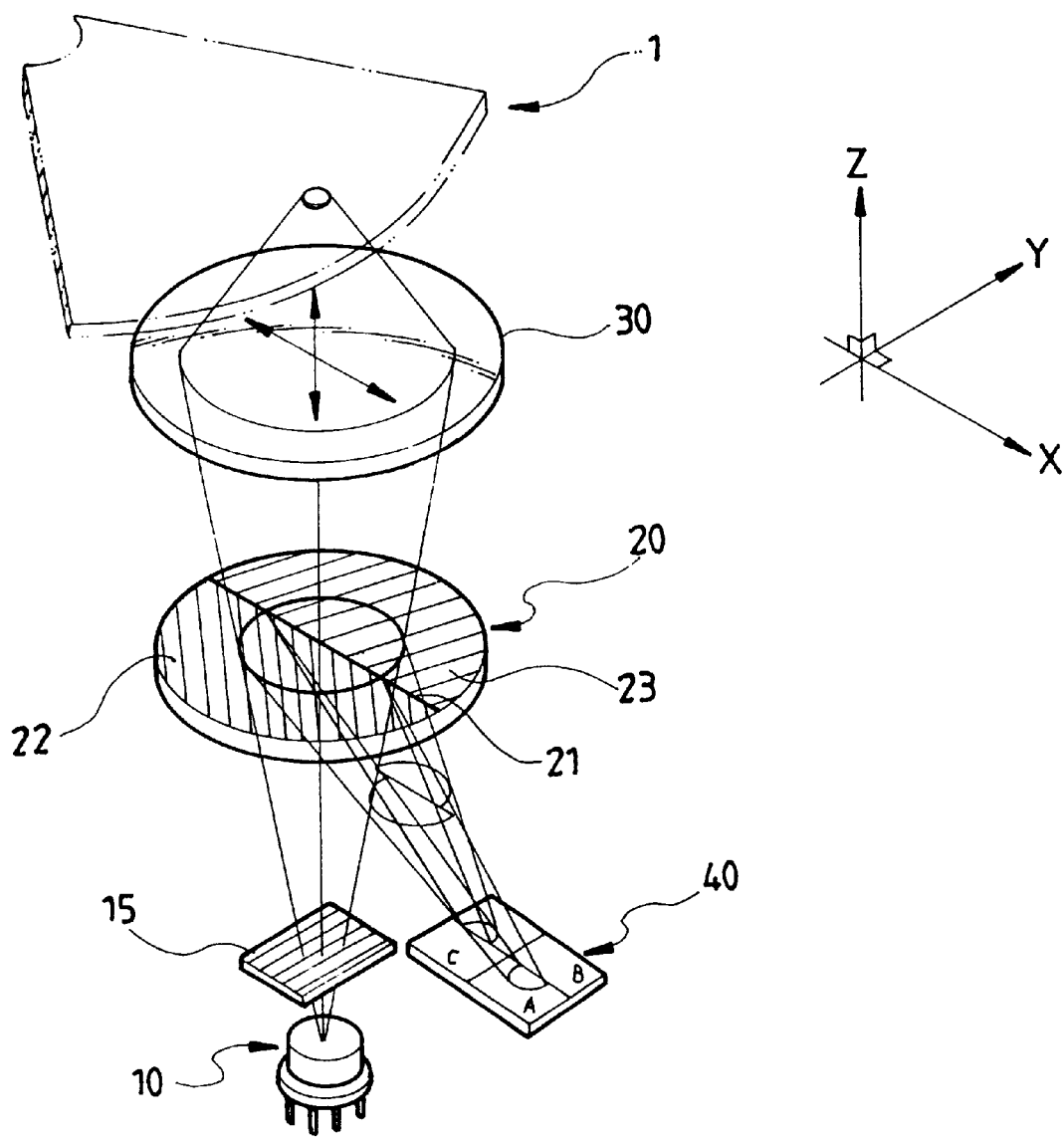
FIG. 1 is a perspective view showing a conventional optical pickup adopting a holographic optical element (HOE)
Figure 2A:
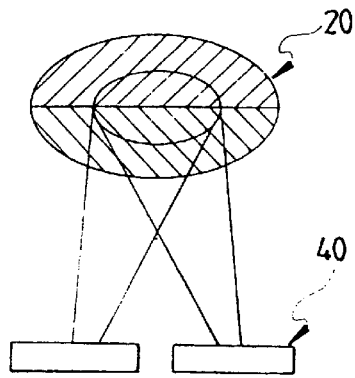
FIGS. 2A, 2B and 2C show the optical path between the HOE and a photodetector in the optical pickup of FIG. 1, respectively, when the objective lens is arranged near a recording medium, at an appropriate distance from the recording medium, and far from the recording medium.
Figure 2B:
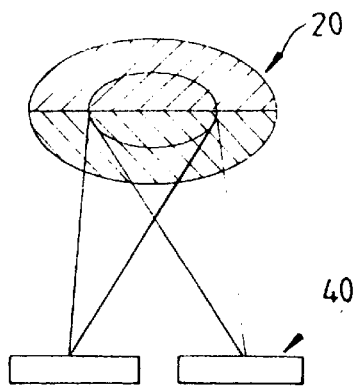
Figure 2C:
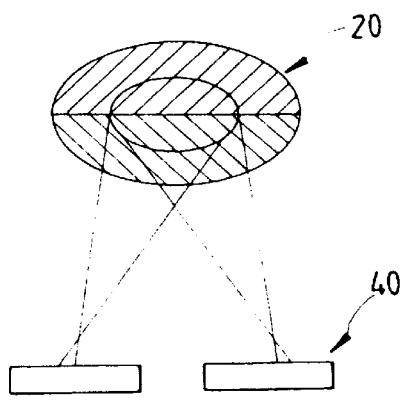
Figure 3A:
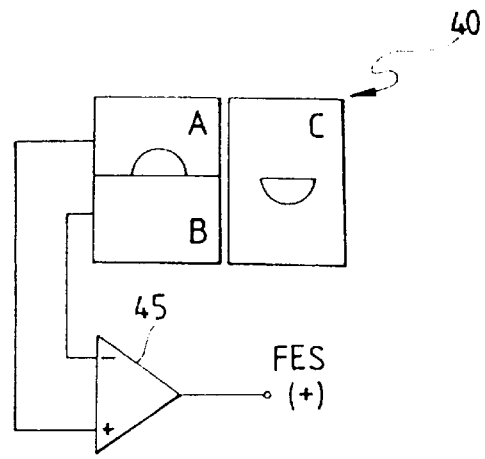
FIGS. 3A, 3B and 3C are diagrams showing the shape of beams formed on the photodetector in the cases of FIGS. 2A, 2B and 2C, respectively.
Figure 3B:
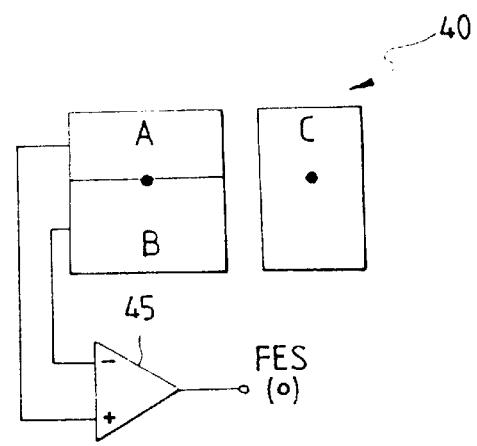
Figure 3C:
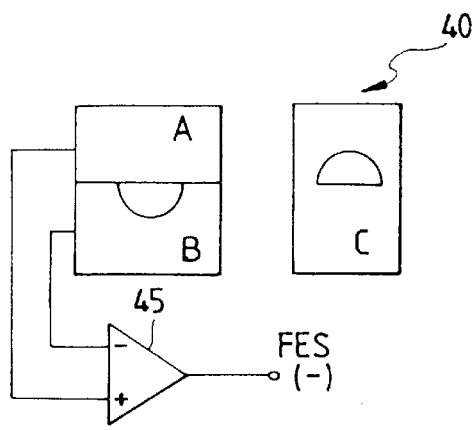
Figure 6B:
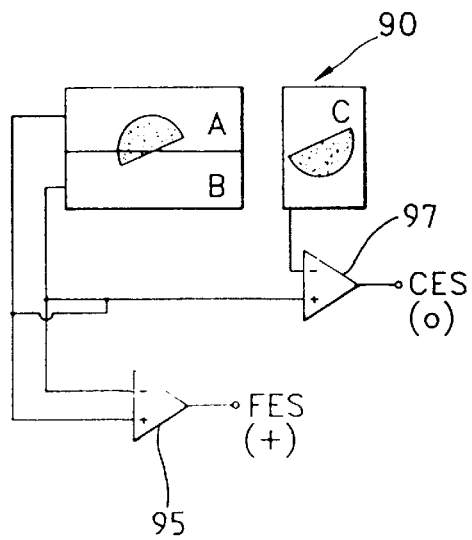
Figure 6C:
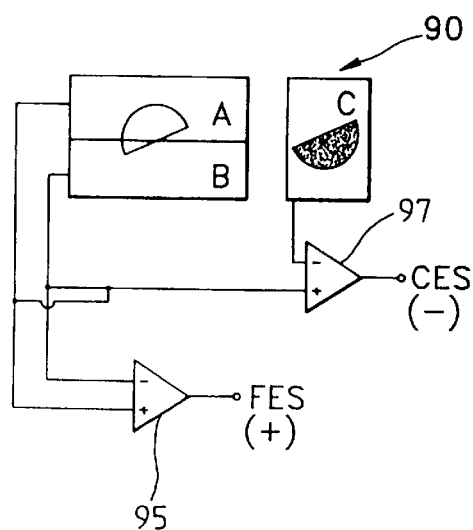

Here, in the cases of FIGS. 6A, 6B and 6C, the objective lens 80 is located near the recording medium 1 as shown in FIGS. 2A and 3A. A positive (+) FES is obtained by a first differential amplifier 95.

Figure 5B:
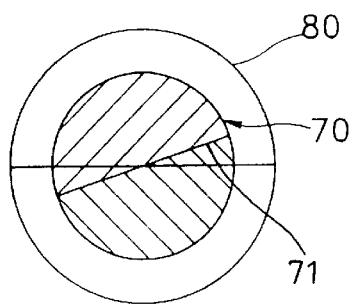

When the objective lens 80 is located on the optical path, the center of the objective lens 80 coincides with the center of the HOE 70 as shown in FIG. 5B. Also, as shown in FIG. 6B, the amount of light received by the first divided plates A and B is equal to that received by the second divided plate C. Thus, a CES of 0 is output from the second differential amplifier 97.

Figure 5C:
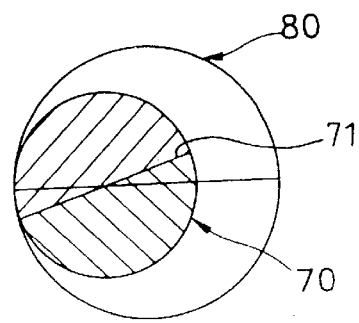

As shown in FIG. 5C, when the objective lens 80 is deviates from the optical path in the (+)X-axis direction, more light is received by the second divided plate C as compared to the first divided plates A and B. Thus, when the signals photoelectrically converted by the first and second divided plates A and B, and the second divided plate C are differentially amplified by a second differential amplifier 97, a negative (−) CES is detected.

By feeding back the obtained CES to the actuator driving the objective lens 80, the deviation of the objective lens 80 from the objective lens 80 can be corrected.

As described above, in the optical pickup according to the present invention, the boundary line 71 of the HOE 70 is arranged at an angle θ with respect to the X-axis driving direction of the objective lens 80, the difference in the amount of light according to the degree of the deviation of the objective lens 80 from the optical path is detected by the photodetector, and the detected difference is fed back to the actuator for driving the objective lens 80, thereby actively correcting the deviation of the objective lens 80 from the optical path. Accordingly, the time required to locate the objective lens 80 shifted by the inertia on the optical path is sharply reduced. Thus, the optical pickup of the present invention can be widely applied as an optical pickup for high-speed accessing.

What is claimed is:

1. An optical pickup comprising:
   a light source;
   an objective lens for converging incident light from the light source onto a recording medium, wherein the objective lens is arranged to be movable in radial and vertical directions of the recording medium;
   a holographic optical element for changing a traveling path of the incident light, the holographic optical element being positioned along an optical path between the light source and the recording medium, the holographic optical element having first and second diffraction plates which are divided along a first boundary line and have different diffraction patterns;
   a photodetector having first and second divided plates which are divided along a second boundary line which is perpendicular to the radial and vertical directions of the recording medium, wherein the first and second divided plates receive light passed through the first and second diffraction plates after the light is reflected from the recording medium; and a differential amplifier for differentially amplifying electrical signals photoelectrically converted by the first and second divided plates;

wherein the first boundary line of the holographic optical element is arranged at a predetermined angle with respect to the radial direction of the recording medium, such that the amount of light received by the first and second divided plates is equal to each other when the center of the objective lens is properly located on the optical path, and the amount of light received by the first and second divided plates is different from each other when the center of the objective lens is deviated from the optical path.

2. The optical pickup of claim 1, further comprising a grating positioned on the optical path between the light source and the holographic optical element for diffractively transmitting the incident light into at least three beams.

3. The focusing device for an optical pickup according to claim 1 wherein the first divided plate of the photodetector is further divided along the radial (X-axis) direction.

4. The focusing device for an optical pickup according to claim 3 further comprising a second differential amplifier for differentially amplifying electrical signals photoelectrically converted by the sub-divided plates of the first plate.

5. An optical pickup that irradiates light emitted from a light source onto a recording medium comprising:

a light source;

an objective lens positioned to direct light from the light source onto a recording medium, the objective lens being movable in relation to the recording medium;

a holographic optical element positioned along an optical path extending between the light source and the recording medium and including first and second diffraction plates defining a first boundary line;

a photodetector including first and second divided plates which are positioned to receive light which has passed through the first and second diffraction plates after the light has reflected from the recording medium; and a differential amplifier operatively associated with the photodetector, the differential amplifier amplifying electric signals received from the first and second plates;

wherein the first boundary line of the holographic optical element is positioned at an angle with respect to the radial axis of the recording medium.

6. The optical pickup according to claim 5, wherein the first and second plates of the photodetector are divided along a second boundary line which is oriented substantially perpendicularly in relation to the radial and vertical axes of the recording medium.

7. The optical pickup according to claim 6, further including an actuator operatively associated with the objective lens to move the objective lens in radial and vertical directions relative to the recording medium.

8. The focusing device according to claim 5 wherein the first divided plate of the photodetector is further divided along the radial (X-axis) direction.

9. The focusing device for an optical pickup according to claim 8 further comprising a second differential amplifier for differentially amplifying electrical signals photoelectrically converted by the sub-divided plates of the first plate.

* * * * *